Feb. 7, 1939.                J. M. McCOLLOCH                2,146,683
                         METHOD FOR ROUGHENING ROLLS
                            Filed Sept. 4, 1936
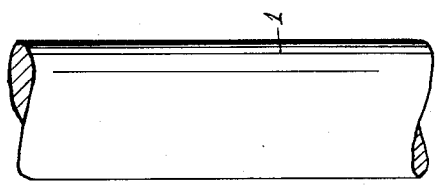
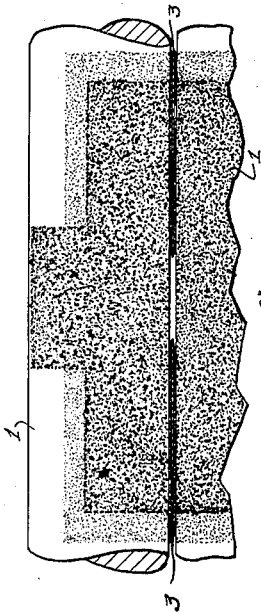
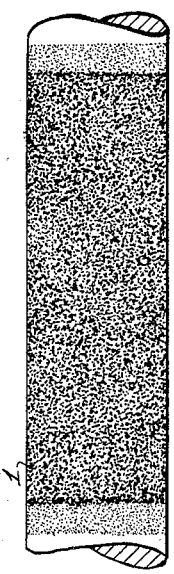
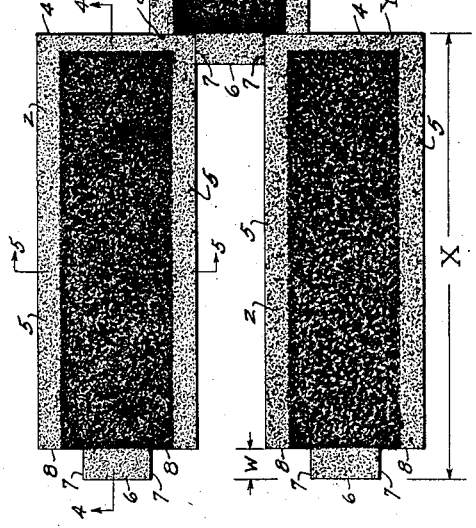
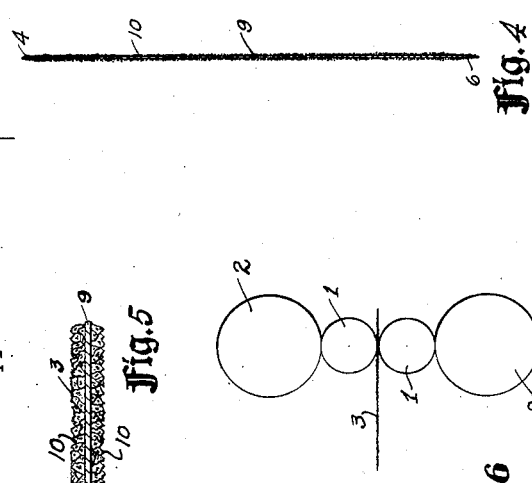
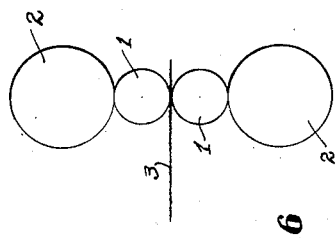
INVENTOR.
JOHN M. McCOLLOCH
BY
his ATTORNEY.

Patented Feb. 7, 1939

2,146,683

UNITED STATES PATENT OFFICE 2,146,683

METHOD FOR ROUGHENING ROLLS

John M. McColloch, Lakewood, Ohio, assignor to The Otis Steel Company, Cleveland, Ohio, a corporation of Ohio Application September 4, 1936, Serial No. 99,355

4 Claims. (Cl. 76—107)

This invention relates to a method for roughening of rolls used for cold rolling of steel sheets and the like, the principal object being to roughen the rolls uniformly over the entire working surface thereof.

As more fully described in United States Letters Patent No. 2,024,007, issued December 10, 1935, to McColloch et al., the working surfaces of rolls can be roughened efficiently by passing between the rolls, under pressure, flexible roughening sheets which consist of heavy paper having relatively thick coatings of coarse carborundum particles bonded to both faces thereof. The carborundum coated sheet is introduced between the rolls with the rolls slightly separated and pressure then is applied gradually, and the rolls driven with the pressure maintained until the entire circumference of the rolls has been subjected to the carborundum particles, whereupon the pressure is relieved and the remainder of the sheet withdrawn from between the rolls.

In the case of relatively short rolls, a carborundum coated sheet which is coextensive in width with the width of the working surface of the rolls may be used for each roughening pass. In such instances, however, it is desirable that the outer end portions of the rolls, where the surface is not to be roughened, gradually blend into the roughened working surface portion. In larger mills, such for example as those using rolls 72 inches in length, it is usually desirable to roughen the rolls over a surface area of from 64 to 68 inches in width. If a sheet of carborundum of such width is passed between such rolls it will wrinkle and become slightly folded and accordingly impress onto the rolls a number of sharp, deep lines of demarcation along the boundaries of the wrinkles and folds and also over-roughened areas corresponding to the wrinkles and folds. These lines and over-roughened areas will be reproduced on the finished steel sheets and render the sheets unfit for many uses.

One of the principal objects of the present invention, therefore, is to roughen rolls with sheets of the character described in a manner such as to effect uniform roughening of the working surface of the rolls and gradual blending of the working surface area with adjacent surface areas of the rolls.

An equally important object is to effect a uniform roughening of any desired width of working surfaces of the rolls with carborundum or roughening sheets of less width than the width of the roll surface to be roughened by the use of a plurality of sheets which are so related during the roughening operation that there is a gradual blending of the roll surface area roughened by each sheet and by the sheets adjacent thereto without any lines of demarcation along the lateral boundaries of the surface portions roughened by a particular sheet.

Other objects and advantages will become apparent from the following specification wherein reference is made to the drawing in which Fig. 1 is a diagrammatic plan view of a plurality of sheets in the proper relation for passage between the rolls;

Fig. 2 is a fragmentary end view of a pair of rolls showing, in section, the roughening sheet therebetween and illustrating the roughening effect of the sheets of Fig. 1;

Fig. 3 is a fragmentary development of a roll which has been roughened in accordance with the present method;

Fig. 4 is a sectional view taken on a plane indicated by the line 4—4 of Fig. 1;

Fig. 5 is an enlarged fragmentary sectional view taken on a plane indicated by the line 5—5 of Fig. 1; and Fig. 6 is a diagrammatic sectional view through a rolling mill illustrating the passage of the flexible roughening sheets between the rolls.

Referring to Figs. 1 and 6, there is illustrated the conventional rolling mill employing hardened rolls I and back up rolls 2 which cooperate with the rolls I in the usual manner, the rolls being mounted for movement relatively toward and away from each other in the well known manner for rolling steel sheets of the desired gauge.

In order to roughen the rolls with the flexible roughening sheets, the roughening sheets 3 are usually placed between the rolls I while the rolls are slightly separated, the pressure then being applied and the rolls driven in the customary manner. The sheets used preferably are relatively thick paper carrying sheets, having comparatively heavy coatings of carborundum particles bonded to both faces thereof, as will later be described, and providing a composite sheet. The rolls used for rolling of steel sheets are heated during the rolling operation by frictional heat developed, this heating being most pronounced near the ends of the rolls. Consequently, in order for the steel sheets which are rolled to be uniform in thickness, it is necessary to compensate for the expansion resulting from this heat. Accordingly, rolls of this type are generally slightly convex toward the center when cold. Necessarily, the flexible roughening sheets must be applied to the rolls while the rolls are cool and in the relatively convex condition.

In the present manufacture of such sheets, no means has yet been found by which sheets of considerable width may be passed through the rolls without wrinkling due to inherent characteristics of the sheet itself or to the slight convexity of the working surfaces of the rolls when the rolls are cool. Since the length of the rolls 1 often is greater than the width of the sheets that can be utilized, a plurality of sheets must be passed through the rolls for effecting roughening over the desired width of working surface.

Accordingly, therefore, as better illustrated in Fig. 1, a plurality of sheets 3, arranged side by side in a predetermined operative overlapping relation, are utilized. Each of the sheets 3 has a main body portion of sufficient length, as indicated by the dimension X, to completely traverse the entire circumference of the roll without any substantial overlapping, allowance being made for elongation of the sheet under pressure. For example, in a roll having a circumference of 63 inches, the dimension X may be slightly less than 63 inches, or about 62 inches, depending upon the pressure applied, as the sheets tend to elongate under the terrific pressure of the rolls. The elongation in any instance, varies with the applied pressure, and allowance may be made accordingly.

The leading margin 4 of the roughening sheet 3, is beveled at both faces of the sheet from the normal surface of the sheet so as to taper down to, and in many instances at the edges of the sheet, partially into the paper itself. Thus, at the leading edge, the paper is fully exposed, the thickness and roughness of the carborundum coatings increasing gradually until blended with the unbevelled surface portions of the carborundum coatings. Usually this bevelled margin is coextensive in width with the sheet 3 and may be from three to three and one half inches in dimension in the direction of travel of the sheets through the rolls, as indicated at Y. The lateral margins 5 of the sheets are correspondingly bevelled from both faces, the bevel being somewhat more flat than at the leading margin 4 so that the width of each bevelled margin 5, transversely of the sheet, as indicated at Z, is slightly greater than the dimension Y.

In the form illustrated, the dimension Z of the margins 5 is about one and one third times the dimension Y of the margin 4. At its trailing end, the sheet 3 is cut away at the rear margins so as to define a tail piece 6 symmetrically disposed with respect to the sheet 3. The lateral edges 7 of the tail piece 6 are inset from the lateral limits of the sheet 3 substantially twice the dimension Z of the bevelled marginal portions 5. The trailing edges 8 of the sheet 3, at each side of the tail piece, are not bevelled, but terminate abruptly at the full thickness.

The tail piece 6 is slightly greater in its dimension W, lengthwise of the sheet 3, than the dimension Y of the margin 4 and, for example, may be about twice the dimension Y. The tail piece 6 is bevelled on both faces from its leading limit to the trailing edge so that at the trailing edge, the paper itself is exposed, as better illustrated in Fig. 5.

In the form illustrated, the sheet 3 comprises a central coarse paper carrier sheet 9 with coatings 10 of carborundum particles bonded to both faces thereof to form a composite sheet. Each of the sheets 3 is correspondingly formed and the dimension of the tail piece 6 transversely of the sheets is preferably such that when a succeeding sheet is placed with one of its leading corners fitting a lateral edge 7 of the tail piece and the adjacent trailing edge 8 of the sheet 3, the inner limit of the margin 5 of the leading sheet will fall substantially in alignment with the inner limit of the margin 5 of the trailing sheet.

In roughening the rolls by means of the sheets 3, the rolls are initially separated and the bevelled leading margin 4 of the initial sheet 3 is started between the rolls, midway between the ends of the rolls. The upper rolls are then lowered so as to apply the pressure on the sheet and are driven slowly so as to pass the initial or leading sheet 3 therethrough. When the leading sheet 3 has passed through the rolls sufficiently so that the tail piece 6 is entering between the rolls, two succeeding sheets 3 are positioned, as illustrated in Fig. 1, with their leading corners fitting the edges 7 of the tail piece 6 and the trailing edges 8 of the leading sheet. Thus the rolls are supported in slightly spaced relation by the tail piece 6 of the leading sheet so that the succeeding sheets may be readily interposed. If greater width of surface is desired to be roughened, the next succeeding sheets are disposed in the same relation to the trailing sheets at the outer lateral limits of the tail pieces thereof and the operation is continued until the entire width of the surface of the rolls to be roughened has been subjected to the sheets. Generally, it is desirable to subject the rolls to two complete passes of carborundum sheets, new sheets being used for the second pass. In the second pass, the method is repeated, the leading edge of the central or leading sheet preferably being started at a circumferentially offset position from the starting position of the initial central or leading sheet. Each sheet can be subjected to only one pass through the rolls as it is completely destroyed thereby.

Referring again to Fig. 1, it is noted that the lateral margins 5 of each sheet are aligned in the direction of travel with the full thickness portion of each succeeding sheet and the lateral margin of each succeeding sheet is aligned in the path of travel with a full thickness portion of the preceding sheet. Thus no part of the roll is subjected only to the roughening effect of the bevelled margins.

The tail piece 6 supports the upper roll only until the weight is transferred to the succeeding sheets, the load or pressure on the rolls gradually leaving the tail piece 6, due to its bevel and gradually being transferred onto the leading margins of the succeeding sheets, due to their bevel, so that no sharp lines of demarcation are present. At the same time, due to the bevel of the margins 5, the roll pressure on the sheets gradually diminishes toward the outer edges of each sheet 3 and gradually increases along the margins 5 toward the center of the succeeding sheet so that no lines of demarcation are present at the lateral limits of the sheets.

When the rolls are thus subjected to a sufficient number of sheets to roughen the working surface desired, substantially uniform roughness is provided and no lines or marks are apparent, the resulting surface being substantially uniform and blending into the unroughened lateral portions of the rolls, indicated in Figs. 2 and 3. It should be noted that though dotted lines in Fig. 2 illustrate the relative position of the sheets and corresponding limits of the roughening effect of each sheet, these lines are only for clearness in illustration and in actual practice, the roughening of the roll is so uniform that there is no indication as to the relative positions of the sheets during their passage therethrough.

The flexible roughening sheets preferably comprise paper cores 9, both faces of which are coated with heavy coatings 10 of carborundum particles bonded thereto in the usual manner, though other cores and other coatings of sufficient hardness may be employed.

The sheets are preferably bevelled as described, by subjecting the margins to grinding rolls or carborundum sheets of similar characteristics, and preferably to such an extent that at the extreme outer edges, the paper is just exposed or slightly cut away at its faces.

Having thus described my invention, I claim:

1. A method of roughening rolls with roughening sheets of less width than the rolls, comprising introducing between the rolls while the rolls are slightly separated, a leading sheet of less width than the rolls and having a trailing end portion of less width than the sheet and tapering toward the adjacent end, and spaced inwardly from a lateral margin of the sheet, applying pressure to the rolls and rotating the rolls to pass the sheet partially therethrough until the tapered trailing end portion is entering between the rolls, introducing between the rolls a trailing sheet of less width than the rolls and having a leading margin tapered toward the leading end, positioning the trailing sheet with a forward corner portion substantially fitting the contour of a lateral edge of the trailing end portion and a trailing edge of a lateral margin of the leading sheet, and continuing rotation of the rolls, whereby gradual transfer of the roll pressure from the leading sheet to the trailing sheet is effected.

2. A method of roughening rolls with roughening sheets of less width than the rolls, comprising inserting between the rolls a leading sheet of less width than the rolls having outwardly tapered lateral margins and a rearwardly tapered rear portion of less width than the width of the sheet, applying pressure to the rolls and rotating the same, inserting between the rolls a trailing sheet, of less width than the rolls and having outwardly tapered lateral margins and a forwardly tapered leading margin, with a lateral edge of said leading margin substantially abutting a lateral edge of the rearwardly tapered portion, and with the inner limit of one lateral margin of one sheet substantially aligned with the inner limit of one lateral margin of the other sheet, and continuing the rotation of the rolls for effecting a gradual transfer of the roll pressure from the leading sheet to the trailing sheet.

3. A method of roughening rolls with roughening sheets of less width than the rolls, comprising inserting between the rolls a leading sheet of less width than the rolls having outwardly tapered lateral margins and a rearwardly tapered rear portion of less width than the width of the sheet, applying pressure to the rolls and rotating the same, inserting between the rolls a trailing sheet, of less width than the rolls and having outwardly tapered lateral margins and a forwardly tapered leading margin, with a lateral edge of said leading margin substantially abutting a lateral edge of the rearwardly tapered portion of the leading sheet, and the inner lateral limits of the tapered lateral margins of the leading and trailing sheets being in substantial alignment with each other in the direction of travel through the rolls, continuing the rotation of the rolls for effecting a gradual transfer of the roll pressure from the leading sheet to the trailing sheet, and continuing the operation with successive corresponding trailing sheets until the entire width of the working surface of the rolls is roughened.

4. A method of roughening rolls with roughening sheets of less width than the rolls, comprising inserting between the rolls a leading sheet of less width than the rolls having outwardly tapered lateral margins and a rearwardly tapered rear portion of less width than the sheet, applying pressure to the rolls and rotating the same, inserting between the rolls a trailing sheet, of less width than the rolls and having outwardly tapered lateral margins and a forwardly tapered leading margin, with a lateral edge of said leading margin substantially abutting a lateral edge of the rearwardly tapered portion of the leading sheet, and the inner limits of the adjacent lateral margins of the leading and trailing sheets being in substantial alignment with each other in the direction of travel through the rolls, continuing the rotation of the rolls for effecting a gradual transfer of the roll pressure from the leading sheet to the trailing sheet, continuing the operation with successive corresponding trailing sheets until the entire width of the working surface of the rolls is roughened, and repeating the operation with the leading sheet initially subjected to the roll pressure at an area of the rolls circumferentially offset from the area of initial application of the pressure to the original leading sheet.

JOHN M. McCOLLOCH.